A. BROLUSKA.
ECCENTRIC LOCK NUT.
APPLICATION FILED SEPT. 5, 1908.

908,542.

Patented Jan. 5, 1909.

Witnesses
Q. B. Baenziger.
I. E. McGram.

Inventor
Amel Broluska
By Newell S. Wright.
Attorney.

ial No. 451,819.

UNITED STATES PATENT OFFICE.

AMEL BROLUSKA, OF DETROIT, MICHIGAN, ASSIGNOR OF ONE-HALF TO ALBERT A. DAY, OF DETROIT, MICHIGAN.

ECCENTRIC LOCK-NUT.

No. 908,542.     Specification of Letters Patent.     Patented Jan. 5, 1909.

Application filed September 5, 1908. Serial No. 451,819.

*To all whom it may concern:*

Be it known that I, AMEL BROLUSKA, a citizen of the United States, residing at Detroit, in the county of Wayne and State of Michigan, have invented certain new and useful Improvements in an Eccentric Lock-Nut, of which the following is a specification.

My invention is designed to provide a novel eccentric lock nut and bolt combined, the same comprising a nut and a locking portion extending longitudinally from the body of the nut, the body of the nut and the locking portion formed of a single piece of metal.

Figure 1:
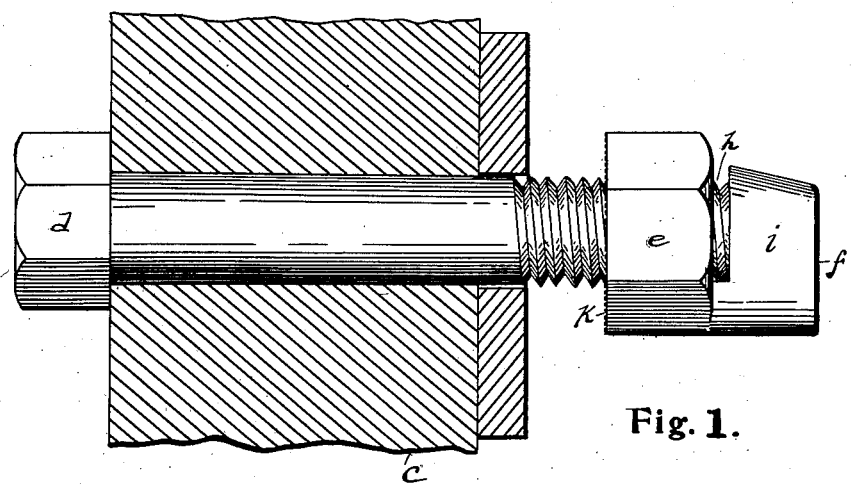
Figure 5:
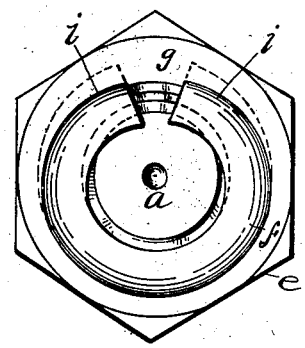
Figure 4:
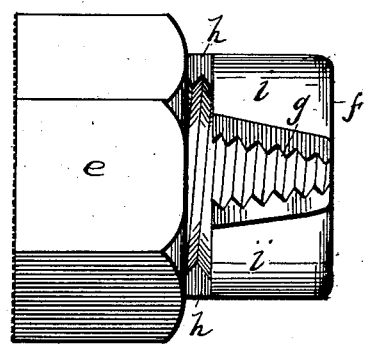
Figure 2:
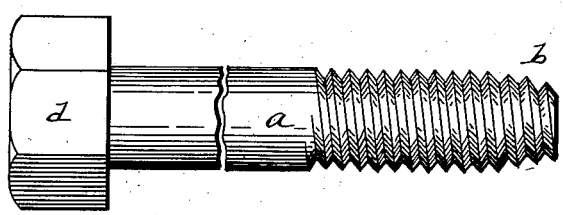
Figure 3:
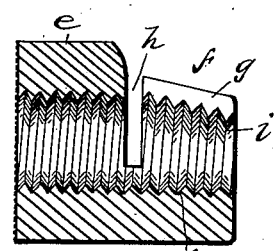

My invention consists of the construction, combination, and arrangements of parts hereinafter described and claimed and illustrated in the accompanying drawings in which, Figure 1, is a view in side elevation showing the bolt in place. Fig. 2 shows the bolt in side elevation. Fig. 3 is a detail view of the nut in longitudinal vertical section. Fig. 4 is a plan view of the nut. Fig. 5 is an end view of the nut and bolt. Figs. 2 and 3 show the bolt and nut in position to be applied the one upon the other.

I carry out my invention as follows: In the drawings *a* represents a bolt, the threaded extremity thereof being tapered for a desired distance only, as indicated at *b*. The bolt may be tapered, for example, back for the distance of three or four threads, the remainder of the threaded portion of the bolt being of uniform diameter in cross section. The entire threaded portion of the bolt is formed with threads running in the same direction.

The letter *c* represents any piece of mechanism to which the bolt is applied and upon which it is to be locked by my improved eccentric lock nut. The head of the bolt is indicated at *d*.

The nut is constructed with a main body portion *e* and with a locking portion or shoulder *f* formed integral with the body portion. The locking shoulder or portion of the nut is formed with a longitudinal opening or slot indicated at *g* and with a peripherally extended slot *h* adjacent to the body portion. The locking portion or shoulder is thus formed with expansible wings *i, i*. The body *e* of the nut is threaded to correspond with the main threaded portion of the bolt. The locking portion or shoulder however, is threaded straight at the bottom or one side thereof clear through uniformly with the interior threads of the body portion of the nut as indicated, for example, in Fig. 3 at *j*, but on the opposite side said locking portion or shoulder is tapered toward its outer extremity as shown, the threads of said opposite side tapering toward the extremity of the shoulder so that the threads of the tapered portion of the locking shoulder are eccentric to the longitudinal center or axis of the nut and of the bolt to which it is applied. The tapered portion of the locking shoulder conforms to the tapered portion of the bolt.

It will be observed that the locking portion or shoulder of the nut is of a funnel shape at one side thereof, the eccentric locking portion of said shoulder being on the upper side of the nut in the position shown in the drawings. I prefer also that the longitudinal slot *g* should be of tapering form toward the extremity of the locking shoulder.

It will be evident that in forcing the nut upon the bolt the body of the nut will readily pass onto the body portion of the threads of the bolt and that the tapered portion of the nut, as the nut is forced upon the bolt, will bind upon the untapered threaded portion of the bolt. The construction of the locking portion of the nut, as above described, affords a degree of elasticity or expansibility to the wings *i, i*, so that when the nut is run home upon the bolt the split portions or wings of the locking shoulder will be spread apart allowing the nut to be run clear up to the work *c* in which the bolt is located so that the inner face of the nut may impinge against the adjacent face of the work. I prefer to furrow or corrugate the inner face of the nut as indicated at *k* to afford a more effectual contact of the nut with the work. The tapered portion of the nut permits the locking portion of the nut to be run up onto the tapered portion of the bolt and then by means of a wrench the entire nut may be forced home upon the bolt the two wings *i, i*, spreading to permit the tapered threaded portion of the shoulder to be run up upon the main threaded portion of the bolt thus securing a very effectual locking of the nut upon the bolt.

The operation of the device will now be fully understood. When the nut is being applied to the bolt it will at first work easily upon the bolt until the tapered portion of the bolt enters the tapered locking portion or shoulder of the nut, when the said locking portion will gradually start working more and more firmly as the bolt enters the eccentric portion of the locking shoulder causing the wings of the shoulder to begin to expand, the nut, feeding tighter and tighter upon the bolt, locking the nut into position thereupon, with a spring grip, and when the nut has been run on into place upon the bolt it will be impossible for the nut to inadvertently work loose, inasmuch as the locking portion has expanded and grasped the bolt with such a pressure as to effectually bind the nut upon the bolt, the expansion and grasping of the locking portion of the nut upon the bolt when in use preventing any vibration from working the nut loose, and still permit the nut to be removed by a suitable wrench without damaging the threads on either the bolt or the nut. When the nut is removed the locking portion will resume its normal position so that the nut may be used again if desired. It will be understood that the threads on the bolt and on the nut are all of the same size.

It will be seen by reference to Fig. 3 that the side of the expansible locking portion of the nut opposite the longitudinal opening $g$ is preferably made of the same thickness as that of the top of the nut while on the opposite side of said locking portion adjacent to the said opening the walls of the expansible wings $i, i$, are made thinner.

It will be seen that in applicant's invention the threads of the locking portion are not compressed upon the bolt after the nut is on, and that the threads of the locking portion are not injured by running the nut upon the bolt. In the manufacture of applicant's nut the top and expansible portion are cast of required form with the longitudinal and peripheral slots formed in the casting. The head or body portion of the nut is then tapped in the ordinary way up to the locking shoulder or portion, the threads in said expansible portion being cut therein by a suitable lathe avoiding any compression of said locking portion.

What I claim as my invention is:

1. An eccentric interiorly threaded lock nut formed with a body portion and with a longitudinally extended expansible locking portion integral therewith, said locking portion eccentrically tapered interiorly toward the outer extremity thereof, the outside diameter of the locking portion being less than that of the body portion.

2. An eccentric interiorly threaded lock nut formed with a body portion and with a longitudinally extended expansible locking portion integral therewith, said locking portion tapered interiorly on one side thereof toward its outer extremity, the outside diameter of the locking portion being less than that of the body portion.

3. An eccentric interiorly threaded lock nut formed with a body portion integral therewith, and with a longitudinally extended expansible locking portion formed with a longitudinally extended opening, the locking portion and body portion interiorly threaded upon the same plane on one side of the locking portion and made tapering upon the opposite side toward its outer extremity.

4. An eccentric interiorly threaded lock nut formed with a body portion and with a longitudinally extended locking portion integral therewith, said locking portion and body portion provided with an intervening peripherally extended slot, and said locking portion provided with a longitudinally extended opening, said locking portion tapered interiorly on one side thereof toward its outer extremity.

5. An eccentric interiorly threaded lock nut formed with a body portion and with a longitudinally extended locking portion integral therewith, said locking portion and body portion provided with an intervening peripherally extended slot, and said locking portion provided with a longitudinally extended opening communicating at its inner end with the said slot, said locking portion tapered interiorly on one side thereof toward its outer extremity.

6. In combination a bolt formed with a threaded portion tapered at the threaded extremity thereof, and an eccentric interiorly threaded lock nut formed with a body portion and with a longitudinally extended locking portion integral therewith, said locking portion being expansible and tapered interiorly toward the outer extremity thereof.

7. In combination a bolt, formed with a threaded portion tapered at the threaded extremity thereof, and an eccentric interiorly threaded lock nut formed with a body portion and with a longitudinally extended expansible locking portion, said locking portion tapered interiorly on one side thereof, and threaded on a straight line with the body of the nut on the opposite side thereof, said locking portion formed with a longitudinally extended opening, and said locking portion and body portion with an intervening peripherally extended slot communicating with said opening.

8. An eccentric interiorly threaded lock nut formed with a body portion and with a longitudinally extended locking portion integral therewith, said locking portion and body portion provided with an intervening peripherally extended slot, and said locking portion provided with a longitudinally extended opening communicating at its inner end with said slot, said locking portion tapered interiorly on one side thereof toward its outer extremity, and said opening made tapering from said slot toward the outer extremity thereof.

9. An eccentric interiorly threaded lock nut formed with a body portion and with a longitudinally extended locking portion integral therewith, said locking portion and body portion provided with an intervening peripherally extended slot, and said locking portion provided with a longitudinally extended opening, said locking portion tapered interiorly on one side thereof toward its outer extremity, the walls of the expansible portion being of less thickness adjacent to said longitudinal opening than upon the opposite side thereof.

In testimony whereof I have signed this specification in presence of two witnesses.

AMEL BROLUSKA.

Witnesses:
N. S. WRIGHT,
G. E. McGRANN.